United States Patent
Deschenes et al.

[15] 3,697,693
[45] Oct. 10, 1972

[54] SYSTEM FOR MAINTAINING THE STATUS OF CREDIT ACCOUNTS

[72] Inventors: Raymond J. Deschenes; Robert N. MacDonald, both of Atlanta, Ga.

[73] Assignee: Data Card Corporation, Minneapolis, Minn.

[22] Filed: March 11, 1970

[21] Appl. No.: 18,665

[52] U.S. Cl.............179/2 DP, 340/152, 340/149 A, 179/2 CA
[51] Int. Cl. ..........................................H04m 11/06
[58] Field of Search......179/2 DP, 2 CA, 2 A, 2 R, 3, 179/4; 340/152, 149, 172.5; 235/61.7 B

[56] References Cited

UNITED STATES PATENTS

| | | | |
|---|---|---|---|
| 2,902,541 | 9/1959 | Singleton | 179/2 CA |
| 3,308,238 | 3/1967 | Brothman | 235/61.7 B |
| 3,314,051 | 4/1967 | Willocx | 179/2 DP |
| 3,407,387 | 10/1968 | Looschen | 340/152 |
| 3,344,401 | 9/1967 | MacDonald | 340/152 |
| 2,828,362 | 3/1958 | Darwin | 179/2 DP |
| 3,383,467 | 5/1968 | New | 179/2 DP |
| 3,299,210 | 1/1967 | Bandy | 179/2 DP |
| 3,549,809 | 12/1970 | Stehr | 179/2 DP |
| 3,351,919 | 11/1967 | Milford | 179/2 DP |
| 3,315,230 | 4/1967 | Weingart | 340/149 |

OTHER PUBLICATIONS

IBM Technical Disclosure Vol. 9 No. July 1966 Allen et al., "Data Transmission System Automatic Control Device"

*Primary Examiner*—William C. Cooper
*Assistant Examiner*—Thomas D'Amico
*Attorney*—Irons, Sears, Staas, Halsey & Santorelli

[57] ABSTRACT

A system is disclosed for maintaining an up-to-date record of credit accounts, and for determining the status of an account prior to completion of a credit transaction to be billed to that account. Upon completion of each credit transaction the system automatically enters information pertinent to the transaction into the appropriate account record maintained at a central data processor station. This continual updating of each credit account as transactions occur makes the current status of any account available immediately upon inquiry by an authorized user of the system. Remote terminal units advantageously located at specified points of sale in each authorized user's facility are utilized to transmit inquiries regarding the status of credit accounts, and to receive replies authorizing or rejecting the transaction for which the inquiry was made.

The system includes a multiplicity of the terminal units, a plurality of supervisory data units each associated with a group of the terminal units, a central data processor station with special purposes or general purpose computers implemented or programmed to manipulate stored data on command from the remote terminal units or from the supervisory data units, and a network for communication between the central data processor station and the remote terminal units and supervisory data units.

19 Claims, 10 Drawing Figures

INVENTORS
RAYMOND J. DESCHENES
ROBERT N. MACDONALD

INVENTORS
RAYMOND J. DESCHENES
ROBERT N. MACDONALD

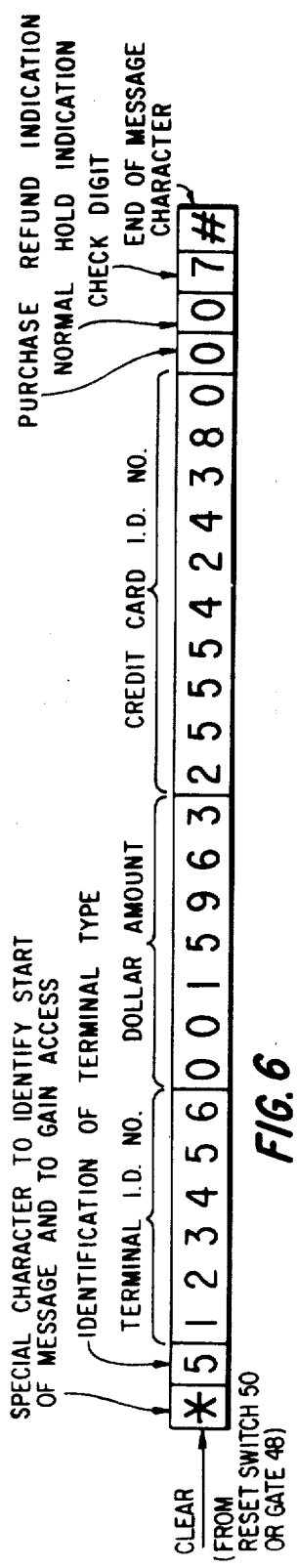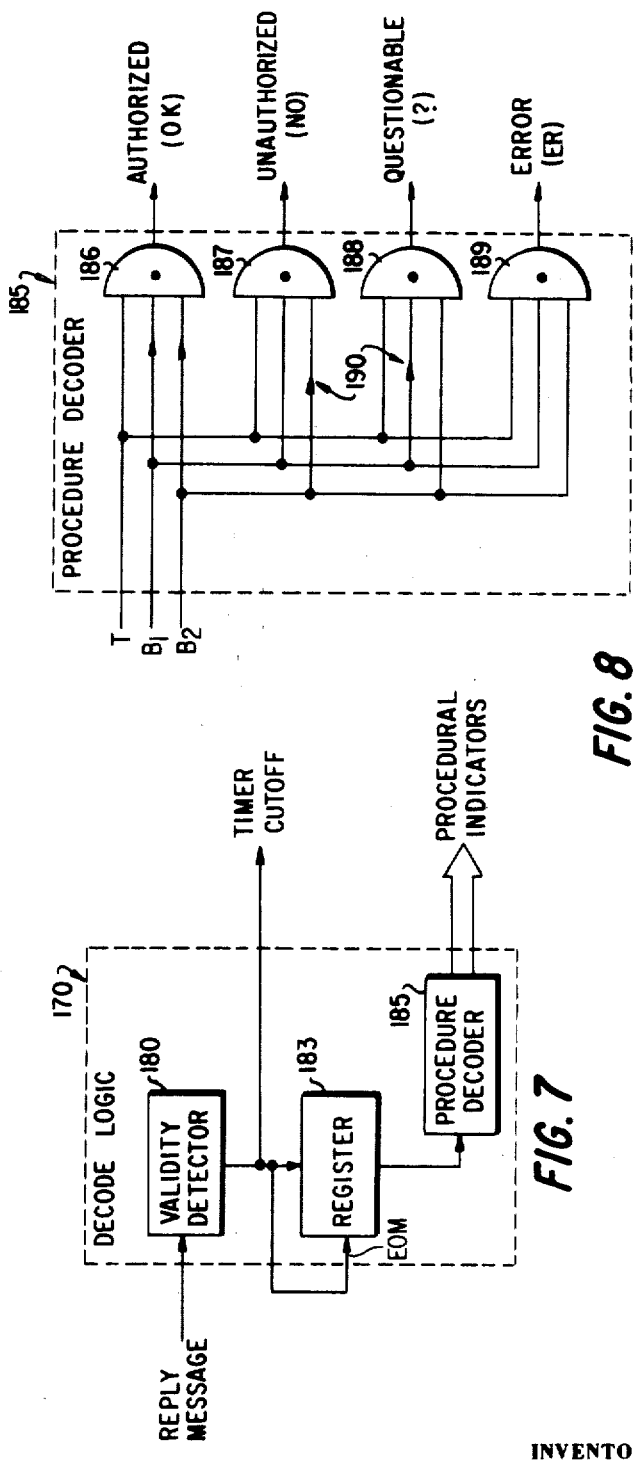
FIG. 6
FIG. 7
FIG. 8
INVENTORS
RAYMOND J. DESCHENES
ROBERT N. MACDONALD

SYSTEM FOR MAINTAINING THE STATUS OF CREDIT ACCOUNTS

BACKGROUND OF THE INVENTION

1. Field of the Invention

The present invention resides in the field of information storage and retrieval systems for transactions involving credit accounts.

2. Prior Art

Many systems have previously been proposed in which a terminal unit is provided at a cashier's station (i.e., a point of sale) in a retail store to permit the cashier to check the credit of a customer who desires to have a purchase charged to his credit account. Typically, the account number of the customer and the amount of the purchase are manually entered into the terminal unit by the cashier. The terminal unit is connected to a nearby central record storage facility which responds to the data entered by the cashier to retrieve stored information regarding the status of the designated account and to compare that information with the newly entered data. The purpose of this type of system is to apprise the cashier of the condition of the account of the customer seeking credit before an actual transaction is completed. The cashier is then in a position to determine whether credit should be extended to the customer to cover the purchase in question, or credit should be refused.

A basic problem that has existed in most systems of the above type is the limited amount of storage available at the central record storage facility. Another and related problem is the limited number of functions which can be performed by the system to check the status of a credit account.

Many of these prior art credit investigation systems have required a special communications network for transfer of information between the terminal unit and the central record storage medium. In practice, the cost of such special networks is sufficiently great to limit the credit investigation system to installation and use within a single facility, such as the single building housing a department store, rather than to provide the greater network which would be required to operate as a single system handling credit investigations for several facilities between and within several buildings. As a result, many independent systems are usually built and operated in a single city, with each independent system requiring its own central record storage medium to permit credit to be verified at that system location. In such instances, each system is capable of updating and investigating credit accounts of customers only to the extent that credit transactions have occurred at that system location, unless the records of other systems are consulted. Where a facility accepts a national or a regional credit account handled by many other facilities, it it virtually impossible to verify the credit of the customer within the confines of this type of prior art system.

The cost of each terminal unit used in the prior systems has also been substantial, and, coupled with the cost of the special communications network, the expense is sufficiently great to preclude the installation of a terminal unit at each cashier's station in a large retail store. The cashier at a station lacking a terminal unit must call a cashier at a station having a terminal unit, to institute a check of the customer's credit before completing the credit transaction. The result is a loss in the efficient utilization of personnel, in addition to a slowdown in the speed with which a credit check could be obtained with a system having a terminal unit at each station.

Still another problem involved in certain prior art systems is that a computer at the central record storage facility must be on-line before the cashier is permitted to enter data regarding the transaction at the terminal unit. Otherwise, the message to the computer will be incomplete and will not evoke the desired response. Thus, valuable computer time and communication network time is lost while the cashier is manually typing in a message, particularly where the cashier is not completely familiar with system operation.

A further difficulty with prior art credit inquiry systems is that many require the cashier to decipher a lengthy stream of encoded data received in response to an inquiry in order to determine how to handle the transaction. Such a requirement assumes that the cashier is sufficiently skilled to perform the task of deciphering a perhaps complex message rather quickly. Otherwise, the customer will encounter substantial delay in a credit transaction.

SUMMARY OF THE INVENTION

The principal object of the present invention is to provide a credit investigation and maintenance system which avoids the several disadvantages of the prior systems set forth above.

In describing an exemplary embodiment of the invention, it will be convenient hereinafter to refer to any input/output device at a station other than the central station as a "terminal unit." Moreover, since systems according to the invention are useful to diverse companies, such as sales organizations, service firms, and credit investigation agencies, the specific location of any terminal unit will hereinafter be termed a "remote station," regardless of whether it is a point of sale, a point of service, a credit account desk, or other point. For the same reason, the party operating the terminal unit at any remote station will hereinafter be referred to as the "operator," despite the fact that such party may perform some additional function, such as would a sales clerk, a cashier, a service representative, a credit manager, and so forth.

The present invention is a system comprising several component parts, each of which contributes to the function of the system to record, to retrieve, and to manipulate data in credit accounts as credit transactions occur. One part of the system is the data processor which is located at a central station and which is capable of servicing terminal units at thousands of remote stations throughout a geographical area. The data processor includes one or more data storage units implemented to record vast amounts of credit account data, and special purpose computer means implemented to retrieve and to manipulate data recorded in the storage units upon instructions from the remote terminal units. Alternatively, the computer means in the data processor may be of the general purpose type, and may thus be programmed to perform its functions.

A second part of the system is the multiplicity of terminal units located at the remote stations, each terminal unit being adapted to accept data inputs to the system for the formation of messages of inquiry to the data processor, and to produce a readout in response to each message of reply received from the data processor. Each terminal unit is provided with indicator means to be energized by and in accordance with the contents of the reply message, to fully inform the operator how to proceed with respect to the credit transaction on which the inquiry is based. Each terminal unit may also be provided with means for producing a record of a completed transaction. In a specific embodiment of the invention, the terminal units are implemented to store input data entered by the operator, and to transmit this data to the data processor in a serial binary message defining an inquiry (which may include an instruction, or a command, to the data processor). It is an important feature of the invention that the inquiry is transmitted by a terminal unit only upon acquisition of an idle communication channel between the terminal unit and the data processor.

Another of the basic component parts of the system is the communications network interconnecting the remote stations and the central station to permit a flow of information between any terminal unit and the data processor. Preferably, the communications network is composed of telephone lines (which may be public lines, or private lines, or both), including local (branch) lines for carrying data at low data transmission rates and each servicing a large group of terminal units, and a trunk line for carrying data at high transmission rates. A multiplexer is utilized to couple the low speed local lines into the high speed trunk line for data concentration (compression) on a time shared basis between the terminal units and the data processor. Each terminal unit can acquire an idle channel consisting of a local line and a trunk line (time-shared) for communication with the data processor by "dialing" of an appropriate telephone number. As a result of this low speed transmission and selective acquisition, a single local line can accommodate a large number of terminal units. The precise number of terminal units that can be handled by one local line will be based on the average number of credit transactions per day at each remote station. Obviously, a local line can accommodate many infrequently used terminal units, but relatively fewer extremely busy terminal units.

In most practical embodiments of the system, it will be desirable to provide another component part in the form of special terminal units at credit offices, each of which monitors and supervises the transactions occurring at a plurality of the remote stations. To distinguish these terminal units and their locations from the terminal units and remote stations briefly described above, they will be referred to as "supervisory terminal units" at "monitor stations." In general, each supervisory terminal unit is capable of performing the same functions as any terminal unit at a remote station, and in addition, is capable of monitoring selected input and output data of any terminal unit which it services. Moreover, a supervisory terminal unit may be used to communicate with the central data processor with respect to a transaction occurring at a remote station which has no terminal unit or in which the terminal unit is disabled. Such communication is initiated by verbal communication between the operator at the remote station and the supervisory operator at the monitor station. The monitoring function of the supervisory terminal unit allows its operator to selectively observe a reply to a particular terminal unit from the data processor. In a transaction for which the reply indicates some question whether completion should be authorized, the supervisory terminal unit is invaluable to inform the supervisory operator of the need to assist the operator at the particular remote station at which the transaction is occurring, and to permit the supervisory operator to issue an overriding command to the computer.

In addition to the functions thus far described, the system can be updated during the night by feeding information concerning payments received on accounts from assembled tapes through tape readers at selected supervisory stations, into the data processor. The system may also be used for other accounting functions necessary to maintain a current set of credit account records at the central station.

BRIEF DESCRIPTION OF THE DRAWINGS

Additional objects, features, and advantages of the present invention will become apparent from a consideration of the ensuing description, taken with reference to the accompanying drawings, in which:

FIG. 6 is a representation of the contents of a message of inquiry from a terminal unit;

FIG. 7 is a block diagram of a decoding unit used in the terminal unit of FIGS. 4 and 5;

FIG. 8 is a block diagram of a portion of the decoding unit of FIG. 7;

DESCRIPTION OF THE PREFERRED EMBODIMENT

Figure 1:
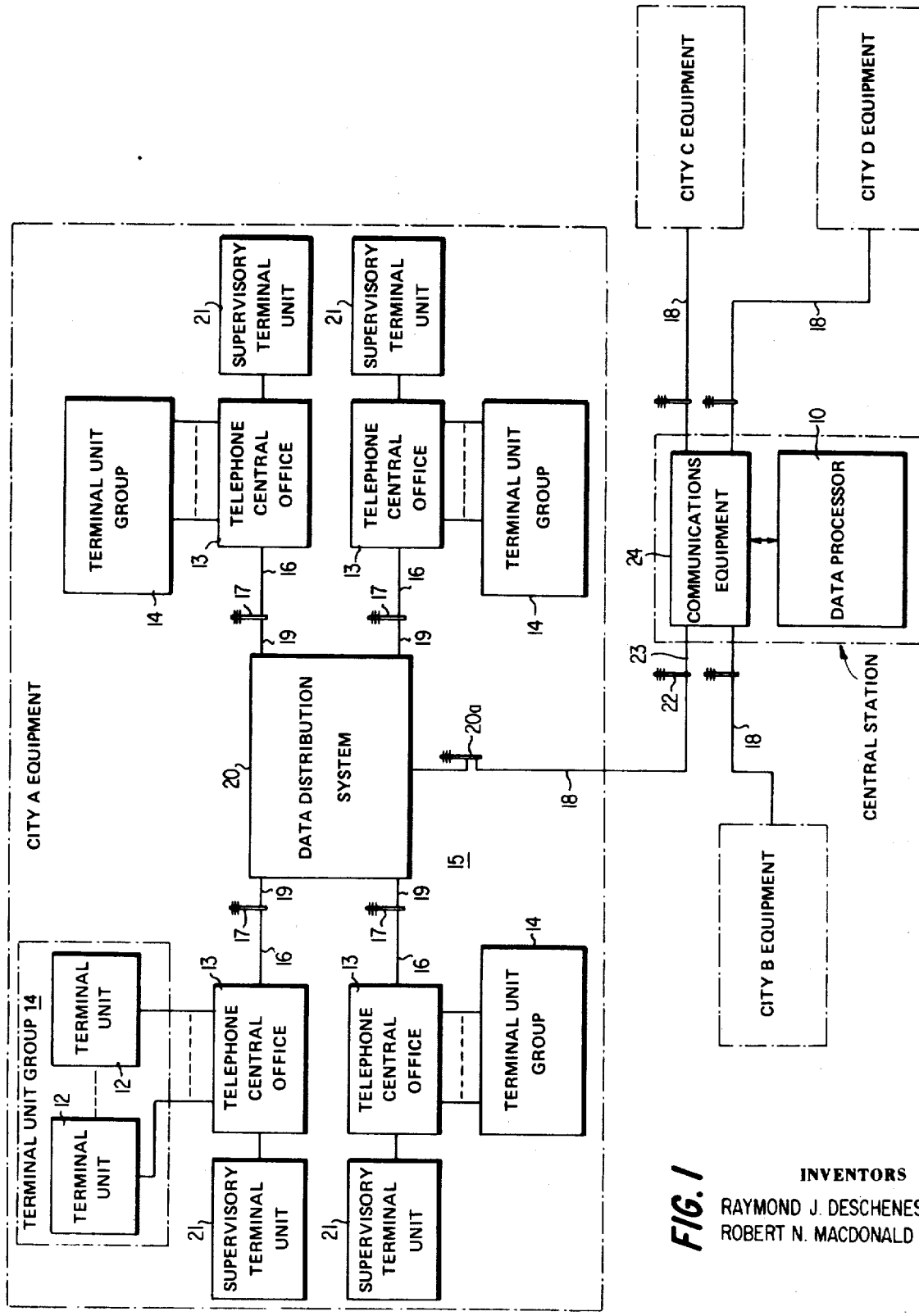
FIG. 1 is a schematic diagram of the overall credit maintenance system according to the invention.

Referring to FIG. 1, the overall system includes a data processor 10 located at a central station. The data processor includes a memory unit having adequate capacity to story the credit account information necessary to permit the data processor to respond to inquiries regarding the status of any customer's credit account. The inquiries are transmitted to the data processor from any of a plurality of terminal units 12 located at remote stations assigned by organizations authorized to use the system. These remote stations may be located in several cities, including the same city in which the data processor 10 is located. Only the local equipment in City A is shown in any detail in FIG. 1, but it is to be understood that this equipment is typical of the equipment in City B, City C, and so forth.

A communications network 15 is provided to interconnect the terminal units 12 and the central data processor 10. Preferably, the communications network 15 utilizes ordinary telephone lines, some of which are used for handling relatively low rates of data transmission, and others of which are used for handling relatively higher rates of data transmission. In particular, transmission of data at a low rate from each terminal unit allows a group 14 of several terminal units to contend for a single local line 16. The low speed transmission of data over local lines 16 is nevertheless sufficiently rapid to preclude the tying up of any local line 16 by only a few terminal units 12 of a group 14 contending for that line. As will presently be discussed in detail, the system has other features which maximize the efficient use of transmission lines and which assure the availability of a transmission line to any terminal unit 12 in a group 14 at relatively frequent intervals.

The low speed data on all local lines 16 in a given geographical area, such as in an entire city, is ultimately compressed together for transmission at a substantially higher data rate on a feeder line 18 to the central data processor 10. In essence, each local line 16 acts as a branch line for one feeder line 18 which constitutes a trunk line. This arrangement in which data is transmitted at slow speed from the terminal units to the local lines 16, and the data appearing on a plurality of local lines is multiplexed into a high speed trunk line 18, is a considerable factor in cost reduction over prior art systems. The lower rate of operation is perfectly acceptable at the terminal unit. Clearly, it makes little difference to the customer in a credit transaction or to the terminal unit operator handling that transaction whether the system performs a credit check in one-tenth of a second or in ten seconds. Yet, the time factor of 100 in this example of system performance is quite significant at the data processing end of the system. That is, if the longer time interval is acceptable over a substantially shorter time interval at the terminal unit, as it is, then the number of terminal units which can be serviced by a central data processor can be increased by the same factor, with no increase in account records at the data processor. Date processing and computer time, which represents a substantial cost factor in comparison with terminal unit operator time or other expense at the terminal unit end, is therefore utilized with high efficiency. As observed above, this high efficiency is achieved with no inconvenience to the customer at the remote station.

Multiplexing of data from local lines 16 to a trunk line 18 in communications network 15 is performed by a data distribution system 20, in each geographical area. Each data distribution system 20 also serves to distribute high speed data on a respective trunk line 18 to the appropriate local line 16, in the direction of transmission from the data processor to a terminal unit. The local lines 16 are connected to the data distribution system 20 by lines 19 from telephone poles 17. Of course, the communications network 15 may use underground transmission lines, rather than "open wire" transmission lines, or a combination of both. Moreover, the communications network may utilize microwave transmission channels along a part of its route. Specific reference is made to the use of ordinary telephone lines only because they are readily available and are relatively inexpensive to lease, in comparison with some other forms of transmission channels. Each data distribution system 20 is connected to its respective trunk line 18 via a line from a pole 21.

Each trunk line 18 serving a multiplicity of remote stations in a given geographical area is, in turn, coupled to communications equipment 24 via a line 23 from a pole 22. The communications equipment 24 is utilized to supply high speed data from the several trunk lines 18 to the central data processor 10, and to distribute high speed data from the data processor to the appropriate trunk lines. Accordingly, communications equipment 24 may correspond quite closely to a data distribution system 20 in data multiplexing and data distributing performance and implementation. In addition, the communications equipment includes transmitting and receiving apparatus for communicating with the data processor 10. In all respects except those to be hereinafter described, communications equipment 24 is, like each data distribution system 20, completely conventional.

In addition to the terminal units 12 located at the remote stations, the overall system includes a lesser number of supervisory terminal units 21 at audit stations. Preferably, a supervisory terminal unit 21 is associated with each group 14 of terminal units 12 and is coupled to the same telephone company central office 13 as that group of terminal units 12.

Figure 2:
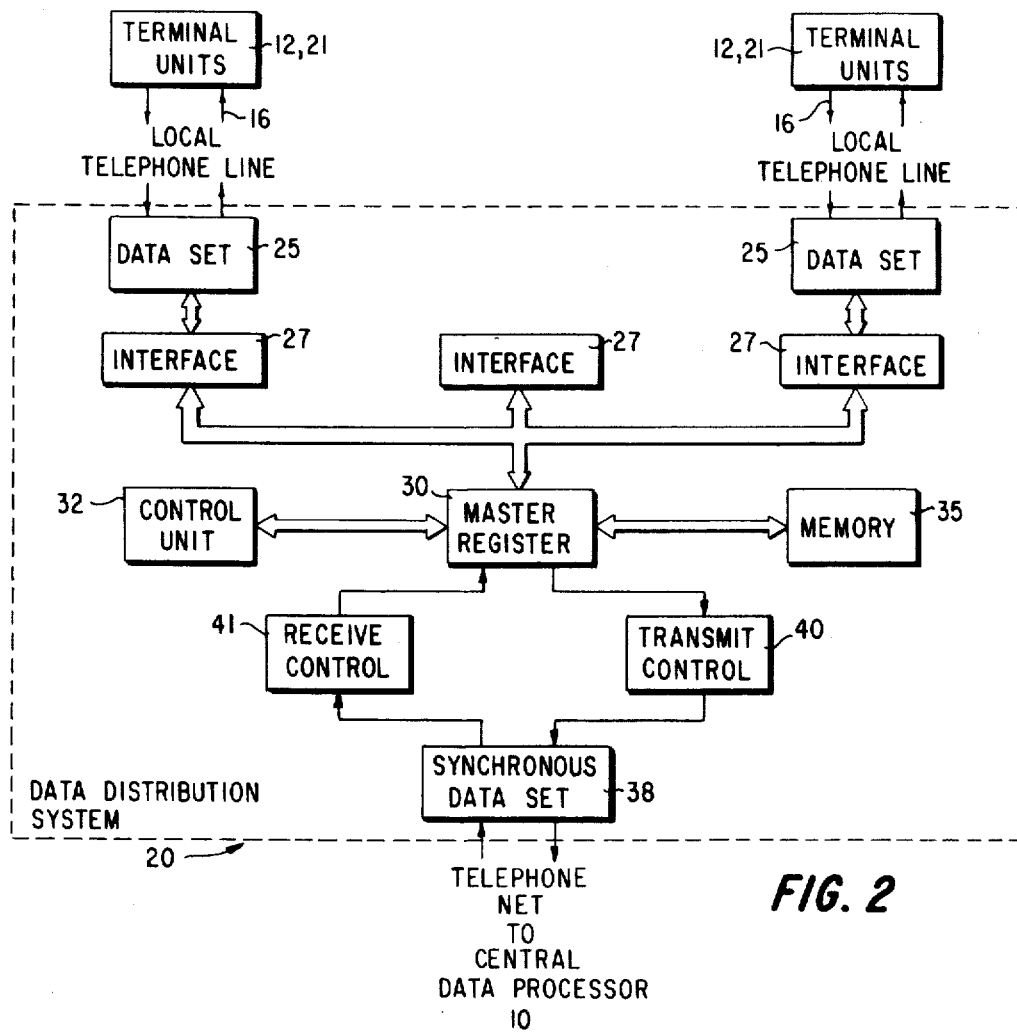
FIG. 2 is a block diagram of a typical data distribution system of the system of FIG. 1.

Each data distribution system 20 comprises a conventional multiplexing storage facility, shown in simplified form in FIG. 2 for the sake of clarity. This basic distribution system may be obtained from American Data Systems, Chatsworth, Calif., and is briefly described hereinafter merely to aid the understanding of the reader. Referring to FIG. 2, local lines 16 are terminated at the data distribution system in respective telephone data sets 25. A switching arrangement exists at the respective telephone central office 13 for each local line 16 to permit any of the terminal units 12, 21 serviced by that central office to obtain entry to the data distribution system via the respective data set 25 and to receive data from the data set, when the local line 16 has been acquired by that terminal unit. A separate interface 27 is provided in the data distribution system for each data set 25, to pass data to and from the respective data set.

The data distribution system may include a master register 30 controlled by a process control unit 32 and having access to a memory 35. The process control unit 32 and the memory 35 are useful, for example, where each data distribution system 20 is to contain special information which must be stored and accessed according to the identity of the transmitting (or receiving) terminal unit. For example, this special information may be desirable to maintain a record at each data distribution system of the extent of usage of the system by each terminal unit, or by each group of terminal units connected to a local line 16.

However, the principal function of the master register 30 is to temporarily store data received from a terminal unit 12 or from a supervisory terminal unit 21 for transmission to the data processor 10, or received from the data processor for transmission to a terminal unit. This storage function requires that master register 30 have a storage capacity sufficient to retain data in the form of a message up to a length to be specified hereinafter, for either direction of transmission for each local line 16 serviced by that data distribution system. In a conventional manner, messages on any given local line 16 may be allotted a specified time slot in a timing sequence, as by scanning, for entry into the master register. Data transmission and reception between the master register 30 and the data processor 10 via the respective trunk line 18 and a synchronous data set 38 terminating that trunk line at the data distribution system is effected under the control of a transmit control unit 40 and a receive control unit 41, respectively. A master clock (not shown) in the data distribution system 20 may be used to synchronize the operation of the several components.

Figure 3:
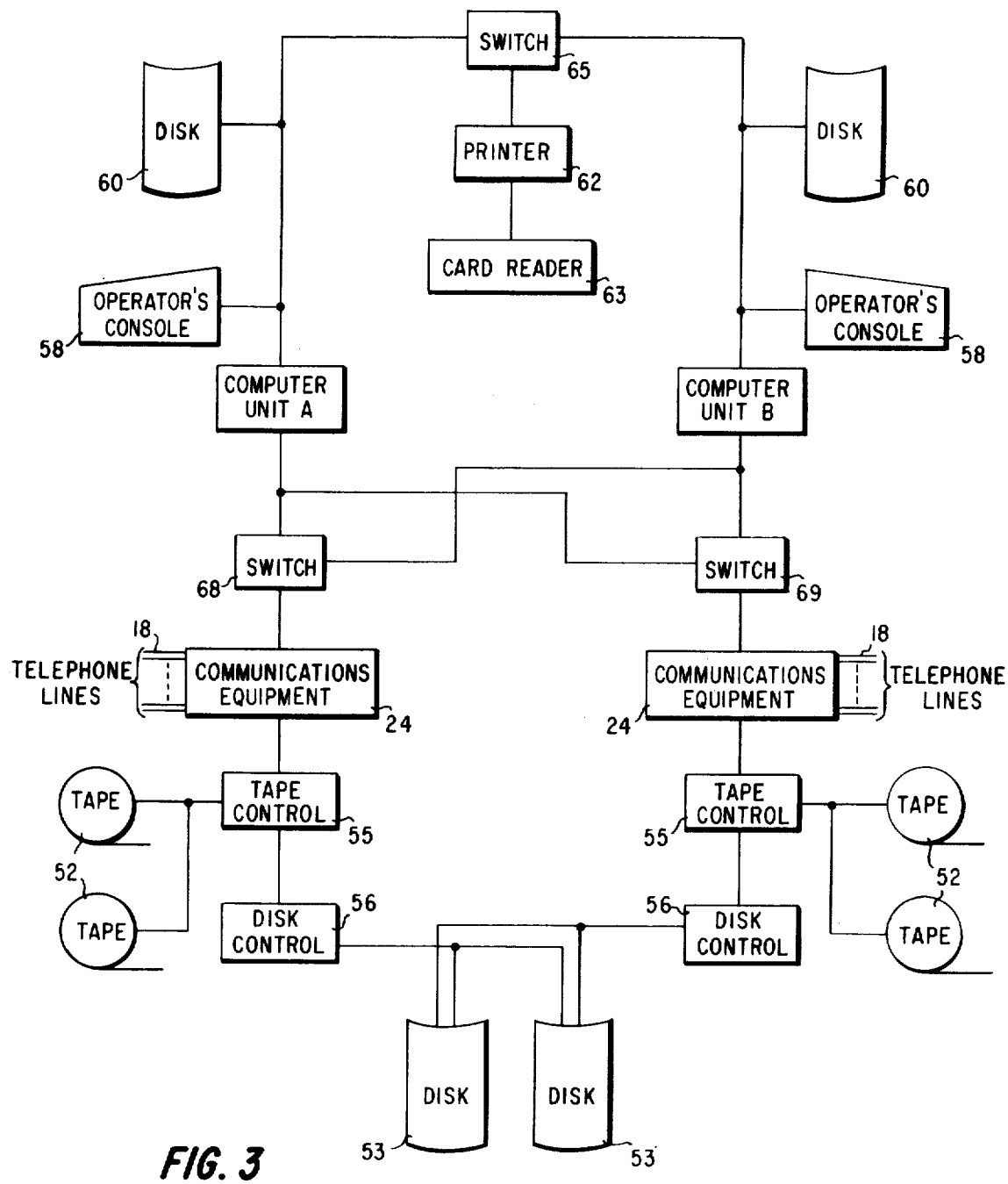
FIG. 3 is a block diagram of the central data processor of the system of FIG. 1.

At the central data processor 10, an exemplary embodiment of which is shown in FIG. 3, the incoming telephone trunk lines 18 from the several data distribution systems 20 serviced by the data processor are connected to communications equipment 24. As previously stated, the communications equipment serves to accept the incoming message data and to supply it to the data processor in an orderly sequence. The sequence of data and the operation performed by the processor in response to the data may be effected in accordance with a general purpose computer program, or a special computer implementation, within a computer unit coupled to communications equipment 24. Thus, the data processor responds to incoming message data to retrieve information stored in various memory banks, such as tape units 52 and disks 53, under the control of tape control unit 55 and disk control unit 56, respectively. Units 55 and 56, of course, operate in accordance with commands from the computer unit.

In the credit maintenance system according to the present invention, the retrieved information is compiled to assess the current status of a particular account for which inquiry has been made. Therefore, the information stored on the tapes 52, disks 53, or other memory units in the data processor central station is credit account information sufficiently extensive to make the necessary assessment in the computer unit. The computer unit formulates a reply message to instruct the inquiring terminal unit operator how to proceed with regard to the transaction, on the basis of the current status of the credit account of the customer seeking the transaction. In addition, the customer's credit account is updated (revised) to reflect the fact that a transaction was initiated, and the disposition of that transaction.

It will be observed in FIG. 3 that two identical data processors, associated with computer unit A and computer unit B, respectively, are provided at the central station. While this duplication of equipment is not absolutely essential, it is useful to preclude failure of the system in the event of a breakdown in one of the computer units or associated equipment. The number of credit transactions occurring during a business day in any city warrants the use of a "spare" computer at the central station to prevent interruption of operation of the system, and to assure confidence on the part of authorized users that the system is reliable. Moreover, the "spare" computer is useful for performing such functions as billing, batch record processing, and file maintenance, while the other computer is on-line to respond to message data from the terminal units. Thus, both computers are in use during normal system operation. During night-time hours, the on-line computer may be operated to assist the "spare" computer in the aforementioned functions.

Provision is made at the central station for operators' consoles 58 to permit manual accessing of records, as from disks 60, and for interrogation of the computer. In addition, a printer 62 and associated card reader 63 may be connected into either data processor through a switch 65. Switches 68, 69 are used for transfer of computers for the purposes mentioned above.

Figure 4:
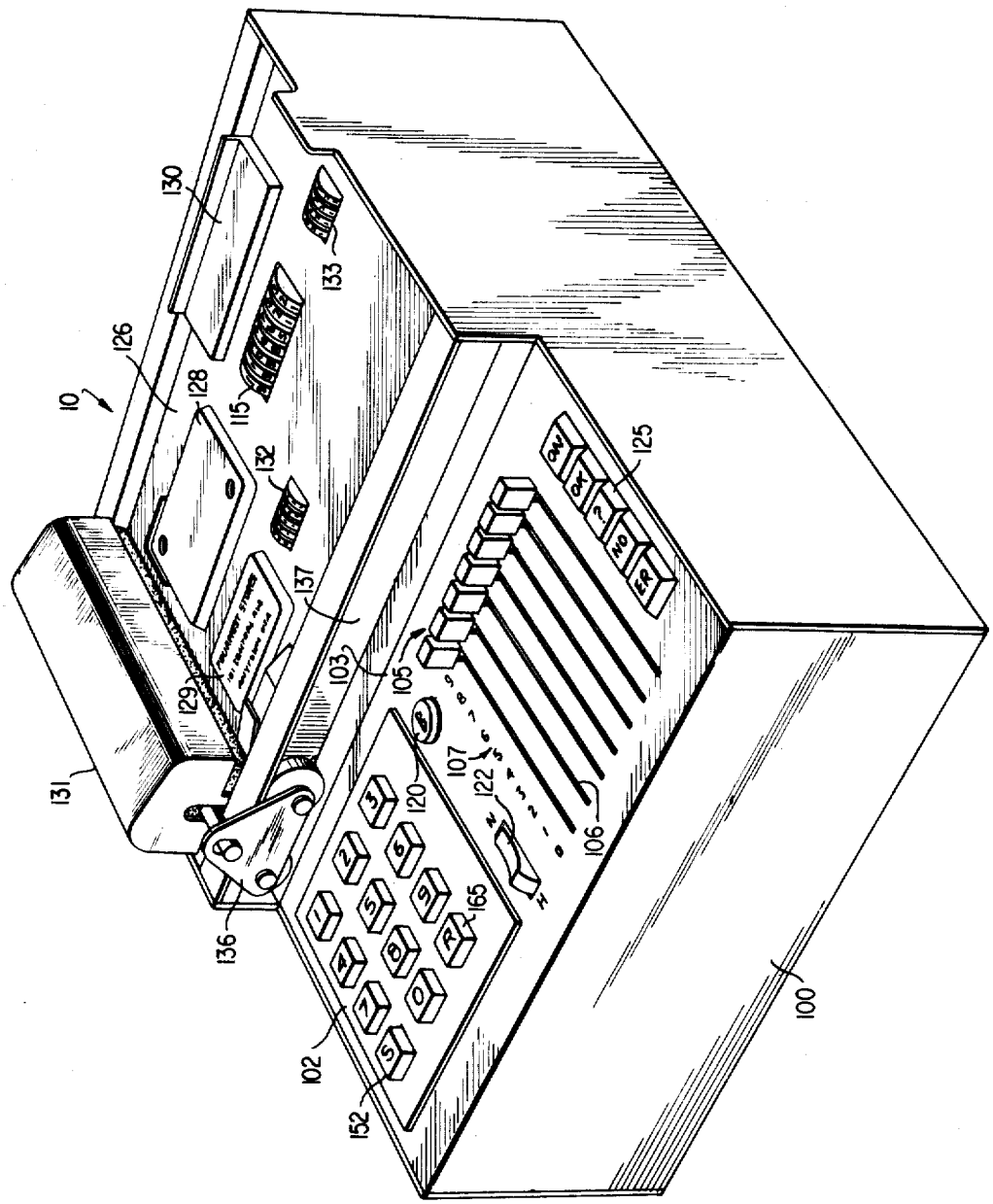
FIG. 4 is a perspective view of the cabinet and controls thereon for a terminal unit of the system of FIG. 1.
Figure 5:
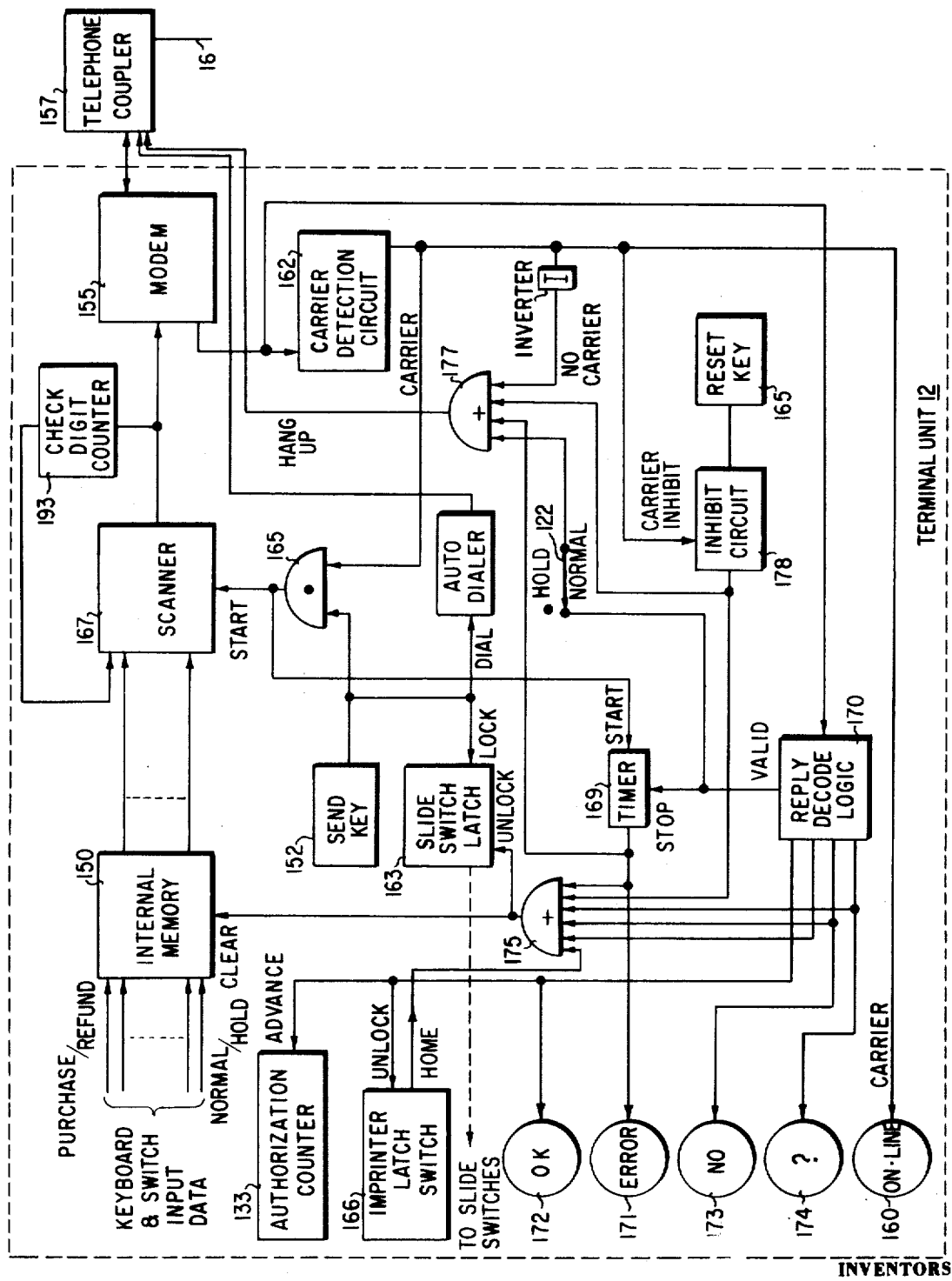
FIG. 5 is a block diagram of a typical terminal unit of the system of FIG. 1.

Referring to FIGS. 4 and 5, the former showing the exterior of the cabinet of an exemplary terminal unit 12 and the latter showing a block diagram of the circuit of a terminal unit 12, each terminal unit is implemented for use with a credit card of an individual or of an organization involved in a particular credit transaction. It is to be emphasized, however, that it is neither essential to the overall system in general, nor to the terminal unit in particular, that a credit card be utilized during the course of the transaction. In the terminal unit embodiment of FIGS. 4 and 5, the identification number, or account number, embossed on the credit card is conveniently transferred to a sales slip which will constitute a record of the transaction, by an imprinting mechanism constituting a portion of the terminal unit. Other known methods of imprinting a sales record may be utilized, however, where some other form of identification of the credit account number of the customer, other than a credit card, is permitted.

With reference now to FIG. 4, cabinet 100 of a typical terminal unit 12 is provided with several keys and switches to permit the operator to enter data pertaining to the transaction into the terminal unit, for ultimate transmission to the data processor 10. A keyboard 102 having 10 digit keys ranging from 0 to 9, and having two auxiliary keys labeled S and R which will be discussed presently, is provided on a front surface 103 of cabinet 100. The 10 digit keys may be arranged in any convenient manner to make them readily accessible and efficiently used by the operator. For example, these keys may be arranged in the same order as the buttons on a standard telephone set pushbutton dial, but that arrangement is obviously not essential. The digit keys on keyboard 103 are used by the operator to manually enter the account number of the customer into storage in the terminal unit, as a portion of the inquiry message.

Also provided on the front surface 103 of cabinet 100 for easy access to the operator is a set of slide switches 105. Each of slide switches 105 can be moved forward or backward in its respective channel 106, adjacent which is provided a column of digits 107. The slide switches 105 are used to enter the amount of the purchase, in dollars and cents, into a message format to be transmitted to the data processor. Furthermore, slide switches 105 are coupled to a set of wheels 115 bearing raised indicia in units of purchased amount, at the sales slip imprinting region 126 of the terminal unit. As will be discussed in greater detail presently, the slide switches 105 are respectively linked to the raised character wheels 115 to advance the wheels to an imprinting position corresponding to the amount of the purchase, upon appropriate positioning of the knobs of switches 105.

A purchase/refund (P/R) switch 120 is also provided on front surface 103 of cabinet 100, for presetting the terminal unit for use with the proper transaction, that is, to the P position of switch 120 for a purchase transaction and to the R position of the switch for a refund transaction. Switch 120 is normally locked in the P position to prevent inadvertent authorization and recordation of a refund when in fact a purchase transaction is occurring, and to prevent indiscriminate authorization of a refund by the operator. The need for use of a key to operate the P/R switch is itself sufficiently informative to the operator to prevent inadvertent errors or improper use. Nevertheless, it may be desirable to provide only supervisory personnel with a key by which to operate the P/R switch 120. Depending upon the position of that switch, a character indicative of a purchase transaction or a refund transaction is automatically entered into the message format for transmission from the terminal unit.

A normal/hold (N/H) switch 122 consisting of a 2-position switch is disposed on front surface 103 of cabinet 100 to permit the operator to select either a normal operation or a hold operation. In the normal operation, the local line 16 which has been acquired by the terminal unit 12 for transmission of an inquiry to the central data processor is released by the terminal unit virtually immediately following receipt of a reply message from the data processor. In other words, the terminal unit must "hang up" in order to terminate its connection to the local line 16 so that the line is available to other terminal units, and this is normally accomplished after each two-way communication. In the hold operation, the connection with local line 16 is maintained by the terminal unit for continued communication with the central data processor for as long as the N/H switch of that terminal unit is in the "hold" position. The hold operation is usually selected by the operator when several messages are to be transmitted in succession to check on the status of several accounts in view of the occurrence of credit transactions involving those accounts. A character representative of the position of the N/H switch 122 is automatically entered at the terminal unit into the message format for any given transaction.

A set of lamps 125 is positioned on front surface 103 of cabinet 100 to be readily observable to the operator. The lamps are preferably color coded, and are also provided with appropriate indicia on their respective caps, to render them distinctive when lit. The lamps are used as guide indicators to inform the operator how to proceed with respect to a given transaction. The content of a reply message in response to an inquiry regarding the given transaction is determinative of which of the lamps 125 is energized, and thereby, what procedure is to be followed by the operator.

A credit card platen 128 and an authorized user identification platen 129 are provided within the sales slip imprint region 126 of cabinet 100. These two platens, along with a boss 130 and two sets of raised character wheels 115, 132 define a substantially level surface over which the roller (not shown) of an imprint mechanism 131 is movable. The two sets of raised character wheels in the sales slip imprint region 126 are for imprinting the dollar amount and the date, respectively, of the transaction on the sales slip. The raised characters on the sets of wheels 115, 132 and on platen 129, and the embossed characters on a credit card placed on platen 128 are all positioned in the plane of the aforementioned level surface to bear against the sales slip at predetermined regions thereof as the roller within imprint mechanism 131 is moved across imprint region 126. The imprint mechanism 131 is restricted to movement over the imprint region by attachment to guide wheels 136 at both sides of the cabinet. The guide wheels roll within channels 137 in the cabinet below and at both sides of the imprint region.

As will presently be discussed in further detail, imprinter 131 has an associated latch to prevent its movement from a "home" position, at the extreme left-hand end of imprint region 126 as viewed in FIG. 4, unless the reply message authorizes completion of the transaction. In the latter event, the imprinter is unlatched for manual movement by the operator. When returned to the "home" position, the imprinter is automatically latched.

With reference now to FIG. 5, the internal circuitry of a typical terminal unit 12 includes an internal memory 150. The internal memory is supplied with input data to be stored, in accordance with the operation of keys and switches by the operator for a given transaction. The storage capacity of the internal memory 150 should be sufficient to hold all the data required for a complete inquiry message pertaining to the given transaction. This required data includes, in addition to that manually entered by the operator, several permanently stored items of information. In particular, the permanently stored information consists of characters designating the type and identity of the terminal unit, and designating the start and the end of a message. When the data pertaining to a specific transaction has been entered into internal memory 150, the memory contains a complete inquiry message for that transaction, because the permanently stored characters remain in their appropriate locations for continual proper positioning in any inquiry message.

The operator then depresses a send (S) key 152 on keyboard 102 in preparation for transferring the inquiry message to the central data processor. In response to actuation of send key 152, a latch mechanism 163 operates to lock slide switch 105 in position to prevent any movement of those switches during actual transmission of an inquiry message. In addition to energizing the slide switch latch mechanism, actuation of send key 152 supplies a *signal* to initiate the operation of an automatic dialer 154. The dialer 154 serves to establish a communication channel between the terminal unit and the central data processor, as is necessary before the inquiry message can be transmitted. This is accomplished upon acquisition of the appropriate local line 16 by the terminal unit.

Each local line 16 is assigned a unique "telephone" number to determine whether the line is busy, i.e., is in use by another terminal unit sharing that local line, or is idle, i.e., is available. It is preferably that the "-telephone" number of the appropriate local line 16 be "dialed" by an automatic dialer upon actuation of send key 152. The automatic dialer 154 responds to actuation of the send key to transmit a series of pulses representing the desired number to a telephone coupler 157 connected to local line 16. If line 16 is idle, a connection is completed with the terminal unit that dialed the number, and the line is thereafter unavailable to other terminal units until the acquiring terminal unit releases the connection (i.e., "hangs up").

Once the connection has been established between the terminal unit and local line 16, a carrier tone is transmitted to the terminal unit from the data set at the local data distribution system 20. The carrier tone passes through coupler 257 and modem 155 and is thereupon detected by a carrier detection circuit 162. The carrier detection circuit then supplies a signal to one input line of a two-input AND gate 165. The second input of AND gate 165 is energized by a signal from the actuated send key 152. In essence, the send signal is indicative of the completion of entry to data into internal memory 150, and the length of this signal should be sufficient that it is present when the carrier tone is detected. Hence, the input condition of the AND gate 165 is satisfied to cause a "start" signal to be supplied by the AND gate to a scanner 167. The scanner is thereby activated to access message data from the internal memory 150 in the proper inquiry message format.

Accordingly, an inquiry message is transmitted from a terminal unit only upon concurrence of the send signal and the carrier tone, and this occurs *after* the data for a complete inquiry message has been manually entered by the operator. Such operation insures that no portion of the message will be lost by partial transmission prior to establishment of a connection to the central data processor. Moreover, this operation further insures that the on-line time of the central data processor for a given terminal unit is minimized, because there is no manual entry of data by an operator while the data processor is on-line.

Upon detection of carrier tone, detector 162 supplies an energizing voltage to an "on-line" lamp 160, in addition to energizing one input lead of AND gate 165. The lighting of lamp 160 informs the terminal unit operator that local line 16 has been acquired, and that the inquiry message is being transmitted.

It may happen that one of the other terminal units coupled to telephone coupler 157 is using line 16 at the time the number for that line is "dialed" by automatic dialer 154. In that event, a busy signal is encountered and the connection is not completed. The lack of carrier tone at detector 162 prevents the energization of on-line lamp 160, thereby informing the operator that local line 16 is presently unavailable. The operator may then simply wait a few seconds and again depress send key 152 to repeat the attempt to establish the communication channel with the central data processor. The number of terminal units connected to a single local line, and the average length of time for a single transaction communication between any given terminal unit and the central data processor, are taken into consideration prior to installing the system to insure that any given terminal unit will have access to its local line 16 within a matter of only a few seconds. It should be noted that instead of automatic dialer 154, the terminal unit may have an associated telephone handset (not shown) by which the operator can manually "dial" the number of local line 16.

The information scanner 167 is coupled to internal memory 150 to access the stored data therefrom in a predetermined sequence in serial binary format to form the inquiry message. This inquiry message is transmitted by the scanner through modem 155 and into local line 16 for transmission to the central data processor via communications network 15.

The operation involving scanner 167 assumes that the message information is stored in internal memory 150 in parallel storage elements, and that the scanner comprises a commutator or equivalent device. Alternatively, however, internal memory 150 may comprise a shift register into which the message data is entered in specific bit locations upon actuation of the appropriate keys and switches by the operator. In that event, an output from AND gate 165 may conveniently be used to start a shift pulse generator (not shown), which replaces scanner 167, for shifting out the contents of internal memory 150 in serial binary format directly to modem 155.

The output of AND gate 165 also supplies a "start" signal to timer 169. The timer is implemented to generate an output signal at the conclusion of a predetermined timed interval from the starting of the timer. If a "valid" reply message is not received by terminal unit 12 from the central data processor within this timed internal, the timer supplies a signal to OR gate 175. In response to an input signal on any of its input leads, the OR gate produces an output to clear internal memory 150 of all temporarily stored message information, and to release latch 163 to unlock all switches and keys controlled by that latch. The output of timer 169 is also coupled to another OR gate 177 to supply the output signal to the latter and thereby cause the terminal unit to "hang up."

A "valid" reply message is any message which is detected by the terminal unit to be free of transmission errors upon receipt from the data processor. In order to detect the presence of an error in a reply message, the message may contain any standard error detecting code for which suitable error detection apparatus is provided at the terminal unit. A reply decode logic circuit 170 is implemented to detect such error and to indicate its presence in the reply message, but is not adapted to correct an error. The reply message is supplied to the reply decode logic circuit via the carrier detection circuit 162. If the reply message is valid, the reply decode logic circuit produces a signal to turn off timer 169 and to "hang up" the connection (via N/H switch 122 and OR gate 177) and decodes the message to energize an appropriate one of the procedural guide lamps 125 on the front panel 103 of cabinet 100 (FIG. 4).

If the reply message is not valid, the timer is allowed to conclude its timed interval to generate an output signal, and thereby to restore the terminal unit to the condition prevailing prior to the entry of inquiry message data. As previously noted, the output signal of the timer is applied as a momentary "release" signal to telephone coupler 157 via OR gate 177 to "hang-up" the connection with local line 16. This precludes a tie-up of valuable communications network time. An error lamp 171 is energized by the output signal of timer 169 to inform the operator that the inquiry message data must be reentered into internal memory 150 and that a communications channel must be reacquired with the central data processor, if further inquiry is to be made regarding the status of the credit account involved in the transaction.

Upon detection of a valid reply message from the central data processor 10, the reply decode logic circuit 170 decodes the message to produce various visual indications for imparting procedural information to the operator. The particular indication depends upon the status of the account, and upon any limitations placed upon the account, as recorded in the central data processor. In each instance, the indication is manifested by the energization of an appropriate procedural guide lamp 125. If the contents of the reply message authorize completion of the transaction by the operator an "authorization" indication is manifested by the energization of an OK lamp 172. If the reply message rejects completion of the transaction, the operator is so informed by an "unauthorized" indication, manifested by energization of a NO lamp 173. The latter indication should occur where, for example, the credit check at the central data processor reveals that the customer is a poor credit risk, or that the identified account number belongs to a customer who has reported loss of his credit card. If the reply message conveys the information that the state of the credit account makes completion of the transaction questionable, the operator is given the appropriate indication by the energization of a lamp 174 bearing a question mark (?). Such an indication will occur, for example, where the amount of a specific purchase exceeds the customer's authorized credit limit, or where the balance due on the credit account is ordinarily paid promptly but at the time of this inquiry is overdue. The supervisory terminal unit 21 at the audit station for the terminal unit 12 that transmitted the inquiry is called into play when the "questionable" indication occurs, as will be discussed in detail presently. The reply decode logic circuit 170 may also be implemented to energize the "error" lamp 174 in place of energization of that lamp by timer 169.

Preferably, in addition to bearing appropriate indicia, each of the procedural guide lamps has a distinct and different color from the others. This permits the operator to readily distinguish between lamps, and thus between the procedural information that they relate. The lamps are conveniently color coded to correspond to everyday warning signals. For example, OK lamp 172 may be green, error lamp 171 may be yellow or amber, and NO lamp 173 may be red to correspond to the usual meanings "Proceed", "Caution", and "Stop", respectively, found in everyday situations. The remaining lamps consisting of "?" lamp 174 and on-line lamp 160 may be blue and white, respectively. However, it will be understood that other colors may be employed for lamps 125, if desired. Again, the important consideration is the provision of a set of visual indicators on the terminal unit in full view of the operator, to apprise the operator of the establishment of a connection with the central data processor, and thereafter, the procedure to be followed with regard to the transaction on which the original inquiry was based.

Referring for the moment to FIGS. 7 and 8, the reply decode logic circuit 170 may have the configuration shown in FIG. 7, and may include a procedure decoder logic circuit 185 having the configuration shown in FIG. 8. The reply message or so much of it as is required by the reply decode logic circuit, is initially examined in a validity detector 180 to determine whether the reply message is valid. The validity detector may make this determination, for example, by checking one or more parity bits in the reply message. If the message is valid it is passed by validity detector 180 with a preceding additional pulse for turning off timer 169. Assuming that the reply message is in serial binary format, it is fed into a register 183 for temporary storage. Register 183 responds to an end-of-message (EOM) character in the reply message to read out its contents in parallel format to the procedure decoder logic circuit 185. The latter circuit decodes the message and energizes the appropriate procedural indicator lamp 125.

A simplified diagram of procedural decoder logic circuit 185 is shown in FIG. 8. The procedural decoder logic includes four AND gates 186, 187, 188 and 189, each having three input terminals and each connected for parallel receipt of three bits. The reply message need only contain two procedural information bits $B_1$ and $B_2$ to provide any of four possible outputs from reply decode logic circuit 170. Clearly, two bits are necessary and sufficient to provide four distinct and different binary value combinations. The third input bit, T, is the previously mentioned validity information pulse added to the reply message by validity detector 180 only when a valid message has in fact been received. If reply decode logic circuit 170, rather than timer 169, is to energize error lamp 171, one of the four AND gates may either be deleted or replaced by a single input OR gate (not shown) for energization of the error lamp by pulse T. Alternatively, the fourth AND gate may be arranged to receive identical bits on its three input leads for energization of the error lamp. The latter configuration is shown in FIG. 8.

Each of AND gates 186, 187, 188 and 189 therefore receives a validity bit T and two message bits $B_1$ and $B_2$. The AND gates are arranged in conventional decoder circuit form to provide one of four possible outputs depending upon which of the four combinations of the two message bits is present in the reply message. Inverters 190 are provided in some of the input leads in the AND gates as necessary to take care of "0" bits. One and only one of the AND gates can have all of its input leads energized at any given instant of time. The output lead of each gate is connected to a respective one of the procedural indicator lamps 125 to provide an energizing voltage to the appropriate lamp.

Returning now to FIG. 5, the energizing voltage generated by reply decode logic circuit 170 for any of the procedural indication lamps 171, 173, and 174 is also supplied in parallel to an associated input lead of OR gate 175. As described earlier, the presence of a voltage on any of its input leads causes the OR gate to produce an output voltage which causes the clearing of internal memory 150 of all temporary data, and unlatching of all switches which had been latched by slide switch latch 163. The remaining input leads of OR gate 175 are respectively connected to the output lead of timer 169, noted earlier, and to a reset switch 165 and to an imprinter latch switch 166.

Energization voltage applied to OK lamp 172 by reply decode logic circuit 170 is also applied in parallel to imprinter latching switch 166 and to authorization counter 133. Thus, when the reply message authorizes completion of the transaction, the OK lamp 172 is lighted to so inform the terminal unit operator, and simultaneously with the energization of the OK lamp, the authorization counter 133 is advanced one unit and the imprint mechanism 131 is released from its "home" position. The imprint mechanism can then be manually moved across the sales slip imprint region 126 (FIG. 4) to produce a record of the completed transaction. In view of the fact that when a transaction is authorized to be completed the credit account is automatically updated, such a record need not be provided for the store unless a copy is desired as a means to check the account record at the central station. However, the customer will generally be provided with a sales slip for his own records.

After the imprint mechanism 131 has been cycled, i.e., to record the transaction, it must be returned to its "home" position. In this regard, it will be observed that the energization of OK lamp 172 is not accompanied by the energization of an input lead of OR gate 175, as occurs for the energization of each of lamps 171, 173, and 174. Hence, when completion of a transaction is not authorized, the authorization indication is not automatically accompanied by clearing of the internal memory and releasing of all switches and keys. No further credit transactions can be handled by the terminal unit until the memory and the switches are cleared. For the latter purpose, imprinter latch switch 166 is implemented to generate a "one-shot" pulse when the imprint mechanism is returned to its "home" position and is locked in place by switch 166. This pulse is applied to OR gate 175 to clear the memory and the switches in preparation for entry of an inquiry message consonant with the next transaction.

The provision of a structure and an operational mode requiring manual movement of the imprint mechanism 131 has several advantages over automatic actuation of the imprint mechanism. First, the transaction record will not be consummated until the operator places the customer's credit card in position on platen 128 (if a credit card *is* required for the transaction), and optionally checks the date wheels 132 and the authorization counter display 133, because movement of the imprint mechanism is controlled by the operator. If automatic movement were provided, and the credit card were not in position on platen 128, the imprint mechanism would nevertheless go through its cycle. Second, manual operation gives the operator an opportunity to seek supervisory assistance, should the need arise, prior to restoring the terminal unit to a fully cleared condition. Third, manual operation of the imprint mechanism does not require bulky motors and linkages within the terminal unit cabinet, as automatic operation would. Fourth, manual operation does not give the customer an uncomfortable feeling that a credit check has been run on his account, regardless of the good condition of that account, as automatic operation of the imprint mechanism might. Furthermore, the latching of the imprint mechanism upon return to its "-home" position assures that there will not be any use of the mechanism to imprint a sales slip unless authorization is given in a reply message to complete a transaction.

The only remaining input lead of OR gate 175 is connected to reset key 165, located on keyboard 102 of cabinet 100 for ready access by the operator. When the reset key is manually actuated, it energizes that input lead to cause the OR gate to provide the memory clearing and switch unlocking functions previously described. The reset key is also coupled to an input of OR gate 177 to permit manual release of the connection with the local line. This manual reset operation may be performed at any time other than when carrier detection circuit 162 has responded to the reception of carrier tone from the central station to supply an energizing signal to an inhibit gate 178 in the reset signal path. When gate 178 is inhibited, reset key 165 can no longer be used to initiate the aforementioned functions until the carrier tone is removed. This arrangement assures that the operator will not inadvertently interrupt the sequence by depressing the reset key during communication with the data processor.

In normal operation, when N/H switch 122 is in the "normal" position (i.e., the closed position in the schematic showing of FIG. 5), the terminal unit releases the "connection" with local line 16 via coupler 157 whenever either a valid reply signal is sensed or the carrier detection circuit 162 generates a "loss of carrier" signal. This is accomplished by connecting the output lead of reply decode logic circuit 170 (through N/H switch 122) and a "loss of carrier" (i.e., absence of carrier tone) output lead of detection circuit 162 to respective input leads of OR gate 177. OR gate 177 is then responsive to an input on either lead to supply a "-hang up" signal to telephone coupler 157. The latter signal, or a signal derived therefrom upon release of local line 16, is sensed by the communications equipment 24 at the central station to "hang up" at that end. It is only when both ends of the communication channel are released that the channel itself is completely released, and within the minimal time interval required to complete the communication between the terminal unit and the data processor.

This operation in which both the terminal unit and the data processor are required to "hang up," and in which each is adapted to respond to a "hang up" signal from the other, is an important feature of the present invention. On the other hand, it permits modes of operation in which a terminal unit can retain the connection with the data processor, and in certain circumstances, the data processor can retain the connection with the terminal unit, without significant deviation in operation from ordinary conditions of operation.

If a hold character is present in the inquiry message from that terminal unit, that character is sensed at the data processor by the communications equipment 24. A timer (not shown) at the central station may then be actuated to initiate a timed period at the conclusion of each message by the holding terminal unit. If a subsequent message is not received by the data processor within the timed period following the conclusion of a message, carrier tone is removed from the communications channel and the terminal unit hangs up. Of course, whenever the N/H switch 122 is in the "hold" position, the reply decode logic circuit is precluded from releasing the local connection because its circuit path to OR gate 177 is open, and no signal can be supplied to the OR gate regardless of whether the reply message is valid or not.

Implementation of the central data processor to override a "hold" command as indicated above is extremely useful for the situation where it appears that continuation of a hold condition is manifestly improper. It will be noted that if the system were implemented so that only a terminal unit could release a communication channel, such an override release function could not readily be implemented at the central station. On the other hand, if the system were constructed to permit only the data processor to release a communication channel, the function provided by timer 169 would not be available to release the connection at the terminal unit. It will be observed that the use of a timed interval to determine whether the connection should be released is common to both of the latter two examples. Accordingly, similar principles of implementation are clearly applicable.

If a questionable credit account status is found by the data processor in response to an inquiry message regarding a particular transaction involving that credit account, a reply message indicative of that status is transmitted to the inquiring terminal unit 12 to energize "?" lamp 174. A further message is also automatically transmitted by the central computer to the respective supervisory terminal unit 21 for that terminal unit 12, advising the supervisory unit that a transaction has occurred involving a credit account of questionable status for that transaction, and informing the supervisory operator of the details of the transaction and of the credit account. However, it is within the contemplation of the present invention for the same reply message transmitted to the terminal unit 12 to be transmitted also to the supervisory unit 21, or only to the supervisory unit, when a "questionable transaction" is detected at the central station. In the latter instances, the required details may be obtained, at least in part, by a voice telephone conference between the terminal unit operator and the supervisory operator. Additional details regarding the credit account status may be obtained directly at the supervisory unit by interrogation of the central computer therefrom. In any event, the supervisory operator may make a determination, on the basis of the available facts, that this particular transaction should be accepted, or that it should be rejected, and issue an appropriate overriding instruction message to the central computer to update the credit account accordingly. A suitable embodiment of the supervisory terminal unit 21 is a conventional keyboard/display (e.g., CRT) unit, preferably with an associated tape reader as an auxiliary input, and also preferably having an audible alarm device which is energized when the supervisory unit receives a message from the central computer. The use of an audible alarm allows the supervisory operator to ordinarily perform tasks other than merely observing a monitoring unit, without impairing the capacity to immediately recognize the existence of an alarm condition.

The supervisory unit is preferably also supplied with an appropriate message from the central computer when an "unauthorized transaction" is to be indicated (by the energization of NO lamp 173) at the inquiring terminal unit 12. The supervisory operator may then take appropriate action to determine whether the rejection of the transaction was the result of fraudulent use of a credit card, for example, which should call for some further action.

A typical format for an inquiry message transmitted from a terminal unit 12 is shown in FIG. 6. A total of 29 characters appears in the inquiry message, in the example shown in FIG. 6. The first character in the message identifies the start of the message and is of appropriate form to uniquely identify the source of the message as a unit authorized to operate in the system. The purpose of using such a unique start character is to preclude access to the system by unauthorized equipment. It is possible, for example, that a standard teletype unit might acquire a local line, by surreptitious connection thereto or by improper wiring. Since an authorized teletype unit is not capable of generating the unique start character, however, any message transmitted therefrom would be ignored by the central data processor. Alternatively, the central data processor may be implemented to sense the appearance of an improper start character and thereupon to generate an appropriate signal to advise a central data processor operator of the location of the local line on which that message appeared. Appropriate action may then be taken to remove the offending unit from the system.

The second character in the inquiry message identifies the type of terminal unit from which the message was transmitted, if several different types of terminal units are usable in the system. The system may, for example, be implemented to operate basically as a credit account status maintenance system, as described herein, but may also have auxiliary use as a fire or burglar alarm system. That is to say, the central data processor may be implemented or programmed to recognize the specific terminal type from which a message is received, and to generate a signal, such as an alarm, at the central station on the basis that a transmission from that type of terminal unit is itself indicative of the existence of an alarm condition.

Message characters three through eight, inclusive, identify the number of the terminal unit. Each terminal unit has a distinct and different identification number from the other terminal units.

Each of the message characters thus far described as permanently stored in internal memory 150, because the signification of the start of a message, the terminal type, and the terminal identification number will remain fixed regardless of the particular transaction. The last character in the inquiry message, identifying the end-of-message (EOM) is also fixed and, hence, is permanently stored in memory 150. The remaining message characters may vary from transaction to transaction and are therefore entered into temporary storage in memory 150 by the operator.

In particular, the ninth through the 15th characters, inclusive, identify the dollar amount of the purchase. These characters are entered by appropriate positioning of the slide switches 105 on the front panel of terminal unit cabinet 100 (FIG. 4). The slide switches are also linked to the set of imprint wheels 115 in the sales slip imprinting region 126. A suitable embodiment of the slide switches and the linkage for accomplishing this dual function will be described presently.

Message characters 16 through 25, inclusive, are entered by means of the digit keys on keyboard 102 to identify the credit account identification number. This is identical to the credit card number where the credit organization (e.g., American Express, Master Charge, etc.) employs credit cards for the purpose of identifying members. One or two of the characters may also be used to identify the particular credit organization to which the customer belongs (e.g., AX for American Express, MC for Master Charge, and so forth).

The 26th and 27th characters are the purchase/refund indication and normal/hold indication, respectively. These characters are automatically entered for a particular transaction in accordance with the positions of switches 120 and 122, respectively, adjacent keyboard 102 on front panel 103.

The 28th character in the message, immediately preceding the EOM character, is a check character which is used as part of an error detection code. The check character is determined by counting the number of binary "1's" (or, alternatively, the number of binary "0's") in the preceding 27 characters of the message, and identifies the total. This is accomplished by a check character counter 193 (FIG. 5) which is responsive to the message character bits emanating from scanner 167 to count the "1's" therein and to supply the total as an input to the scanner for entry in the 28th character location. When the inquiry message is received at the data processor, the "1's" in the first 27 characters are again counted and the total must tally with the check character. Otherwise, an error is indicated.

The error detection code may also include a parity bit which accompanies each character and indicates whether the binary code for that character has an even number of "1's" (including none), or an odd number. For example, the parity bit is "0" for an even number, and is "1" for an odd number. This may be entered into each character by any known parity bit generation technique.

The table below contains one example of a suitable binary code (and appropriate parity bit) for each character in an inquiry message other than the check character. The check character will always be a number that depends on the binary composition of the preceding characters in the message. Obviously, a minimum of four binary bits is both necessary and sufficient to encode the sixteen distinct and different characters which may be used in an inquiry message in this example.

TABLE 1

| Character | Parity | Binary Code |
|---|---|---|
| 0 | 0 | 0 0 0 0 |
| 1 | 1 | 0 0 0 1 |
| 2 | 1 | 0 0 1 0 |
| 3 | 1 | 0 1 0 0 |
| 4 | 0 | 1 0 0 1 |
| 5 | 0 | 0 0 1 1 |
| 6 | 0 | 0 1 1 0 |
| 7 | 1 | 1 1 0 1 |
| 8 | 0 | 1 0 1 0 |
| 9 | 0 | 0 1 0 1 |
| End of Message | 1 | 1 0 1 1 |
| Start of Message | 1 | 0 1 1 1 |
| Purchase | 0 | 1 1 1 1 |
| Refund | 1 | 1 1 1 0 |
| Hold | 0 | 1 1 0 0 |
| Normal | 1 | 1 0 0 0 |

Figure 10:
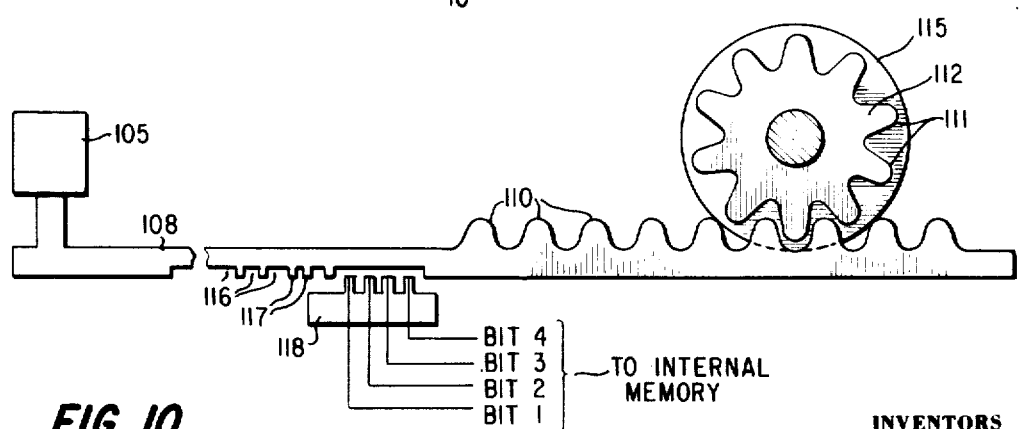
FIG. 10 is a side view of an embodiment of a slide switch and linkage for use in the terminal unit of FIGS. 4 and 5.

It will be observed from the Table that the code for characters 0-9 is non-standard. However, any suitable digital code may be used. The reason for preferred use of the code of Table 1 is the ease of constructing the slide switches 105 and their respective linkages to implement this code in comparison to, say, the American Standard Code for Information Interchange (ASCII). Referring to FIG. 10, the linkage associated with each slide switch 105 includes a rack 108 having a series of protuberances 110 uniformly spaced apart adjacent one end of the rack. These protuberances mesh with the teeth 111 of a circular gear 112 journalled into a concentric imprint wheel 115 of the set of dollar amount wheels in the sales slip imprint region. Accordingly, as switch 105 is moved within its respective slot 106 for positioning adjacent a selected numeral in the adjacent column 107 (FIG. 4), wheel 115 is rotated through an appropriate angle to position the same raised numeral thereon in imprinting position.

Rack 108 also has a plurality of slots 116 cut therein to define non-uniformly spaced projecting elements 117. A read head 118 having uniformly spaced sensing elements 119 thereon is fixed relative to the movable slide switch 105. When the slide switch is positioned at the 0 numeral in column 107 the sensing elements 119 of read head 118 are not in contact with any projecting element 117 of rack 108. Hence, none of the four output bit leads associated with respective ones of sensing elements 119 has an output therein. This corresponds to the condition of 0000 as the binary code for the decimal numeral 0 in the above Table. The slots 116 are cut in rack 108 so that projecting elements 117 are positioned to contact sensing elements 119 in accordance with the remainder of the binary code for characters 0-9 shown in the Table. Thus, as the slide switch is moved to a numeral in column 107, the projecting elements 117 contact sensing elements 119 to produce the binary code for that numeral on the four output bit leads. These leads are connected to appropriate storage locations in internal memory 150.

Figure 9:
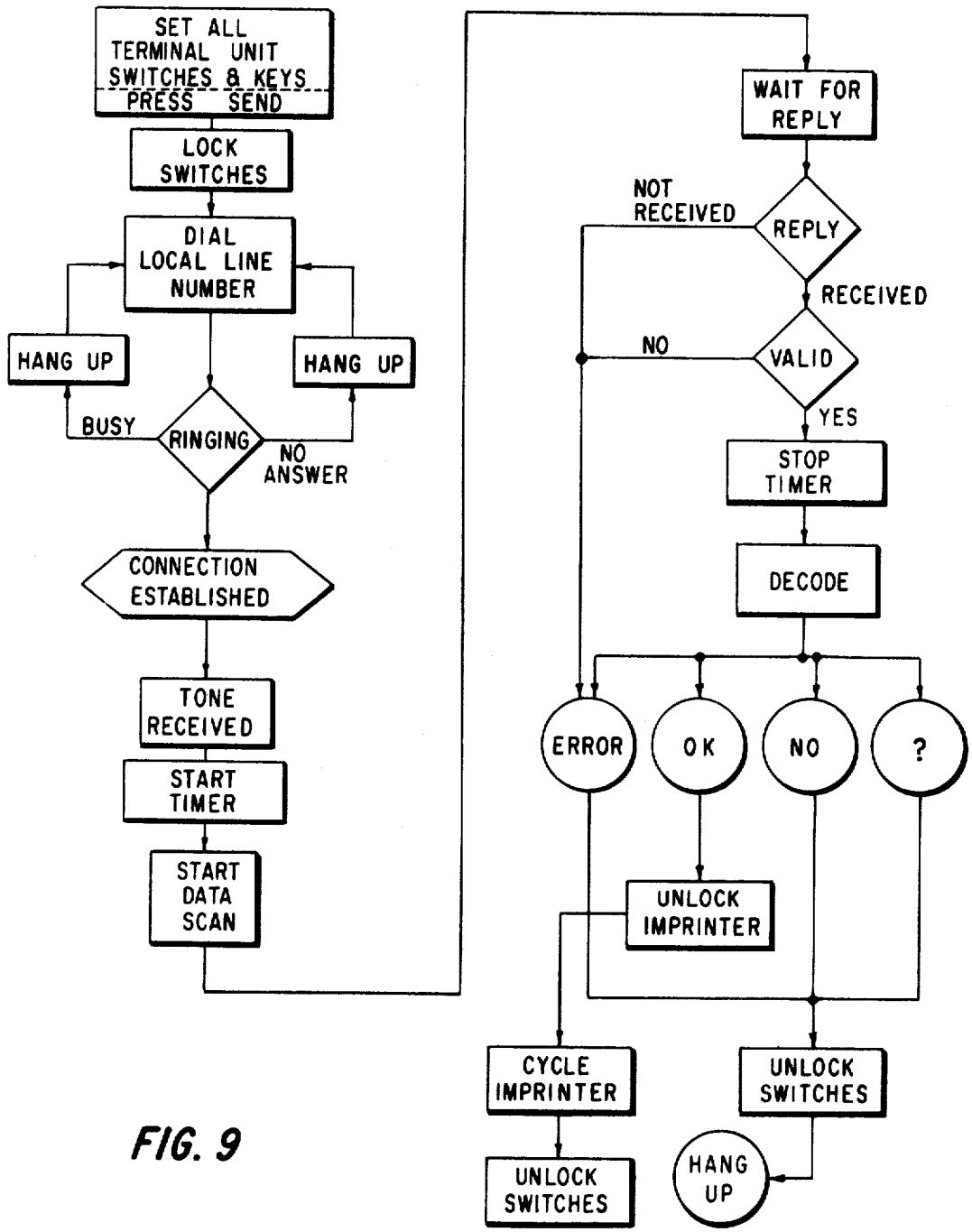
FIG. 9 is a flow chart of the operation of the terminal unit of FIGS. 4 and 5.

The operation of the overall system and its various components should be quite clear from the foregoing description. However, a brief description of the procedure followed at a terminal unit 12 for a transaction will now be described, for the sake of completeness. Concurrent reference is made to the flow chart of FIG. 9. The customer initiates the transaction by presenting his proposed purchases and his credit card to the terminal unit operator. The operator places the credit card on platen 128 and proceeds to set all switches and keys of the terminal unit to enter the data regarding the transaction into internal memory 150. The operator then depresses the send key to actuate the automatic dialer and thereby to acquire local line 16 provided the line is not busy. If it is busy there will be no lighting of the on-line lamp 160, and the operator must repeat the attempt to acquire the local line. If there is no response on repeated attempts, line failure is indicated. When the local line is "captured" a communication channel is established with the central data processor, as indicated by the energization of the on-line lamp. The inquiry message is automatically transmitted to the data processor in response to concurrence of the send signal and the received carrier tone.

The timer 169 is started at virtually the same instant that the data in memory 150 is scanned. If a reply is received from the data processor within the timed interval set by timer 169 it is checked for validity to stop the timer. Otherwise, the timer energizes error lamp 171. The reply message is decoded to energize an appropriate one of the procedural guide lamps. If an "authorization" indication is manifested, the imprint mechanism is released to permit manual imprinting of a sales slip. If any of the procedural lamps are energized, the terminal unit automatically hangs up. If the "questionable" transaction lamp, or the NO transaction lamp, is lit a message is also supplied by the computer to the supervisory terminal unit at the proper monitor station.

The low cost of the overall system permits the entry of an appropriate change in a credit account for *each* transaction occurring at *each* remote station. This is essential if the system is to be relied upon to accurately reflect the current status of a customer's account regardless of the location of the remote station at which that customer may engage in a credit transaction. The continual updating of each credit account provides great protection against the type of fraudulent use of credit in which credit purchases far exceeding an authorized limit on an account are made in a short span of time at a series of stores where the credit is normally honored. By use of the present system, each store has available the current balance of the credit account, regardless of whether a transaction involving that account occurred at another store only minutes before.

Another factor essential to maintaining a current set of credit account records at the central station is the entry of payments as they are received on the accounts. These entries are most conveniently handled by one specific location in an authorized user's facility, and preferably by a supervisory terminal unit at the monitor station within or near the office at which such payments are normally received from the customer, whether in person or by mail. The entry of payments into the central station account records may be accomplished from the keyboard of the supervisory terminal unit 21, by appropriately coding the input message as a payment message. Such entry is particularly suitable at an authorized user's facility where relatively few payments are normally received, most payments being directed to a different central office. However, more frequently it will be desirable to record the payments received during a given business day on a tape, and to transmit the payment data to the central station from a tape reader after the facility's close of business (e.g., during the night).

The system is readily implemented to permit the billing of each customer whose account has an outstanding balance on a preselected day of each month, directly from the central station. To that end, the data processor simply accesses each account balance from the stored records and, if the balance exceeds zero, prints out a statement to the customer. If an authorized user prefers to handle the accounting and billing for its own customers, a supervisory terminal unit at the facility may be provided with a printer. The necessary account information is received and printed out by the printer upon appropriate interrogation of the central data processor.

Another possible function of the system is the daily provision by print-out to each authorized user of a list of credit cards which have been reported lost or stolen, or which have been used for fraudulent purposes. Of course, in the system which has been described, each terminal unit 12 may be provided with a special indicator responsive to a decoded reply message to visually indicate to the operator that a lost, stolen, or fraudulent credit card or credit identification number is being used in the transaction.

It will be apparent from the foregoing specification that the present invention is not limited to usage in investigating, verifying, manipulating, and/or accounting of credit account information, but may be employed in a wide variety of data communications systems. It is therefore desired that the invention be limited only by the appended claims.

The terminal unit disclosed hereinabove is disclosed in greater detail and claimed in the copending application of R. J. Deschenes et al., entitled "Terminal Unit for Credit Account Maintenance System", Serial No. 18,571, filed on even date herewith, and assigned to the same assignee as is the present invention.

The invention shown and described with reference to FIG. 10, is disclosed and claimed in the copending application of Thomas E. Johnson, entitled "Slide Switch Encoder", serial No. 20,648, filed Mar. 18, 1970, and assigned to the same assignee as is the present invention.

We claim as our invention:

1. A system for handling credit transactions at a plurality of remote stations in accordance with credit account records maintained at a central station, comprising:

a terminal unit at each of said remote stations for producing a coded inquiry message to determine the status of a credit account from the records at said central station in accordance with a credit transaction involving that credit account at a remote station;

a data processor at said central station responsive to an inquiry message from a terminal unit, for accessing information from said records pertaining to the respective credit account and for formulating a coded reply indicating one of the following: a positive response that the credit account is in an acceptable state, a negative response that the credit account is in an unacceptable state, or an indefinite response;

a communications network including a plurality of communication channels for transmitting inquiry messages from each terminal unit to said data processor and for transmitting reply messages from said data processor to the respective terminal unit, in response to selective acquisition of a communication channel by each inquiring terminal unit;

each of said terminal units including means for decoding the reply message received from said data processor, and means responsive to the decoded reply message for indicating one of a plurality of possible procedures to be followed in handling a credit transaction, according to the credit account state from which the reply message was formulated; and a supervisory terminal unit coupled to said communication network for monitoring reply messages and for being disposed in an inoperative mode in response to the positive response and in an operative mode in response to either a negative or indefinite response to acquire a communication channel between said supervisory terminal unit and said central station.

2. The system according to claim 1, wherein:
said supervisory terminal unit includes means responsive to a reply message indicative of one of said selected procedures for signalling a need for assistance in handling the credit transaction at the terminal unit whose inquiry message prompted that reply message.

3. The system according to claim 1, wherein:
said data processor means includes means for revising credit account records according to the respective procedures dictated by said reply messages.

4. The system according to claim 1, wherein:
each of said first-named terminal units includes means for transmitting said inquiry messages at low data rates, and
said communications network includes means responsive to inquiry messages transmitted from each terminal unit at low data rates for multiplexing said inquiry messages to said data processor at relatively higher data rates.

5. The system according to claim 1, wherein:
said supervisory terminal unit includes means for supplying instruction messages to said data processor to disregard the status of credit accounts for which reply messages have been formulated, to override a procedure indication based on a previous reply message at a first-named terminal unit of said group.

6. The system according to claim 5, wherein:
said supervisory terminal unit includes a display for visually observing messages transmitted to and received from said data processor.

7. The system according to claim 1, wherein:
each of said terminal units and said data processor includes a separate means for releasing a communication channel therebetween, each of said acquired communication channels being terminated only in response to releasing thereof by both the terminal unit and the data processor which it connects.

8. The system according to claim 1, wherein:
said data processor includes two computers each having access to the same credit account records, one of said computers normally participating in the response to inquiry messages from each of said terminal units and the other of said computers normally at least partly engaged in the billing of credit accounts, for availability in the event of incapacity of the first computer.

9. The system according to claim 1, wherein:
each of said first-named terminal units includes timer means for releasing the terminal unit from its communication channel with said data processor in response to the lack of receipt of a reply message at that terminal unit within a predetermined timed period from the transmission of an inquiry message therefrom.

10. A data communications system, comprising:
a central station,
a data bank at said central station,
a data processor having access to data stored in said data bank at said central station,
a plurality of remote stations,
means at each remote station for transmitting an inquiry message and for decoding a received reply message,
a communication network selectively responsive to a connect signal from each of said remote stations for selectively connecting the respective remote station to said central station for supplying inquiry messages referenced to data stored in said data bank to said data processor and for supplying reply messages formulated by said data processor from said stored data in response to the respective inquiry messages to the respective remote stations, said communication network being further responsive only to disconnect signals from both a remote station and the central station for terminating the connection therebetween,
means at each remote station for selectively supplying a connect signal to said communication network,
means at said central station for supplying a disconnect signal to said communication network with respect to a connection between the central station and a particular remote station upon the conclusion of transmission of a reply message to that remote station from the central station, and
means at each remote station for selectively supplying a disconnect signal to said communication network.

11. The data communications system according to claim 10, wherein:
said means at each remote station for selectively supplying a disconnect signal to said communication network comprises means responsive to a reply message received by that remote station to automatically issue a disconnect signal.

12. The data communications system according to claim 10, wherein:
said means at each remote station for selectively supplying a disconnect signal to said communication network comprises means responsive to a reply message received by that remote station for at will issuing a disconnect signal.

13. The data communications system according to claim 10, wherein:
said means at each remote station for selectively supplying a disconnect signal to said communication network comprises reset switch means enabled for supplying a disconnect signal only at predetermined times.

14. The data communications system according to claim 10, wherein each of said transmitting means provides an inquiry message including a particular character identifying said originating remote station, said central station including security detection means responsive to the aforementioned character for identifying said remote station and for providing a manifestation of a received inquiry message without one of the particular identifying characters.

15. The data communications system according to claim 10, wherein said communication network includes a plurality of communication channels, each of said remote stations including coupling means for selectively acquiring one of said communication channels for transmission and receipt of messages to and from said central station.

16. A system for handling credit transactions at a plurality of remote stations in accordance with credit account records maintained at a central station, comprising:
- a plurality of terminal means, each located at a respective remote station at which a credit transaction may occur, each said terminal means being constructed and arranged for selective entry therein of data regarding a credit transaction, including a credit account number;
- central computer means disposed at the central station for accessing selectively information from the credit account records according to the credit number of a particular credit account and for formulating a reply message indicative of the accessed credit account record;
- means for providing a message communication path between each of said remote terminal means and said central computer;
- coupling means at each terminal means for selectively coupling and decoupling said remote terminal means to and from said message communication path respectively;
- each of said terminal means including detection means responsive to the establishment and loss of a message communication path from said terminal means to said central station for providing first and second signals respectively indicative thereof; and
- reply means for receiving and translating the reply message from said central computer means to provide a manifestation of the state of the assessed credit account;
- said reply means responsive to the reply message for providing a third signal indicative of the receipt thereof;
- said coupling means responsive to each of the second and third signals for decoupling said terminal means from said message communication path;
- each of said terminal means including switch hold means for either transmitting the third signal to said coupling means or for interrupting the transmission of the third signal to said coupling means, thereby maintaining said message communication path from said terminal means to said central station after receipt of the reply message.

17. The system according to claim 16, wherein said control station includes control means responsive to the decoupling of one of said terminal means from said message communication path, for decoupling said central station from said message communication path.

18. The system according to claim 28, wherein each of said terminal means provides an inquiry message selectively including a hold character, said control means comprising timing means responsive to the detection of the hold character within the received inquiry message for providing an interval of predetermined duration after receipt of the inquiry message before the decoupling of said central station from said message communication path.

19. A system for handling credit transactions at a plurality of remote stations in accordance with credit account records maintained at a central station, comprising:
- a plurality of terminal means each located at a respective remote station at which a credit transaction may occur, each said terminal means being constructed and arranged for selective entry therein of data regarding a credit transaction, including a credit account number;
- central computer means disposed at the central station for accessing selectively information from the credit account records according to the credit number of a particular credit account and for formulating a reply message indicative of the accessed credit account record;
- means for providing a message communication path between each of said remote terminal means and said central computer;
- coupling means at each terminal means for selectively coupling and decoupling said remote terminal means to and from said message communication path respectively;
- each of said terminal means including detection means responsive to the establishment and loss of a message communication path from said terminal means to said central station for providing first and second signals respectively indicative thereof;
- storage means for receiving and for storing data regarding a credit transaction, said storage means responsive to the first signal for reading out and transmitting the stored data from said terminal means along said message communication path to said central station; and
- reset means for generating a reset signal, said storage means responsive to the reset signal to clear the stored data therefrom, said coupling means responsive to the reset signal for decoupling said terminal means from said message communication path; said reset means responsive to the first signal from said detection means inhibiting the generation of the reset signal.

* * * * *